Fig. 4.

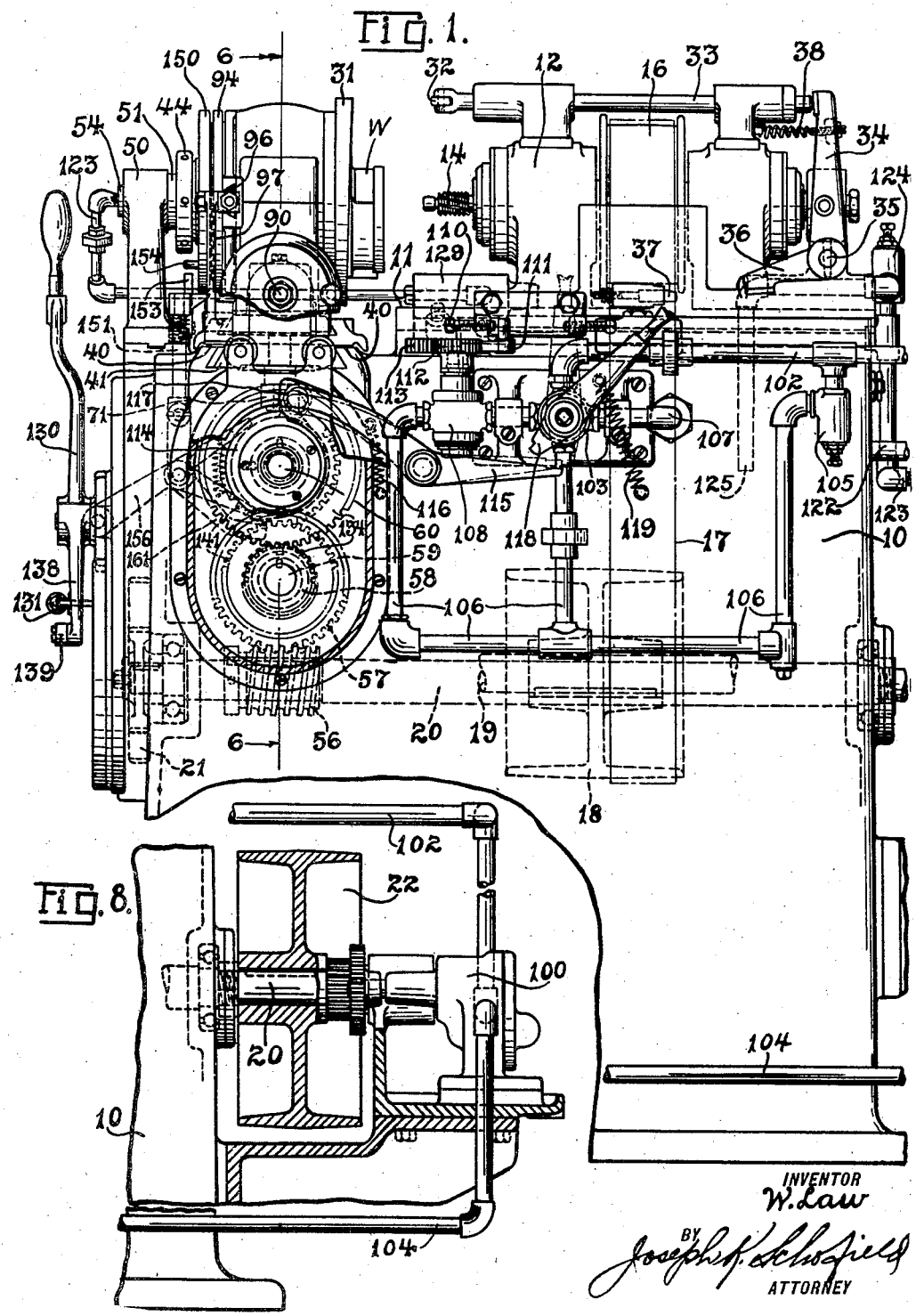

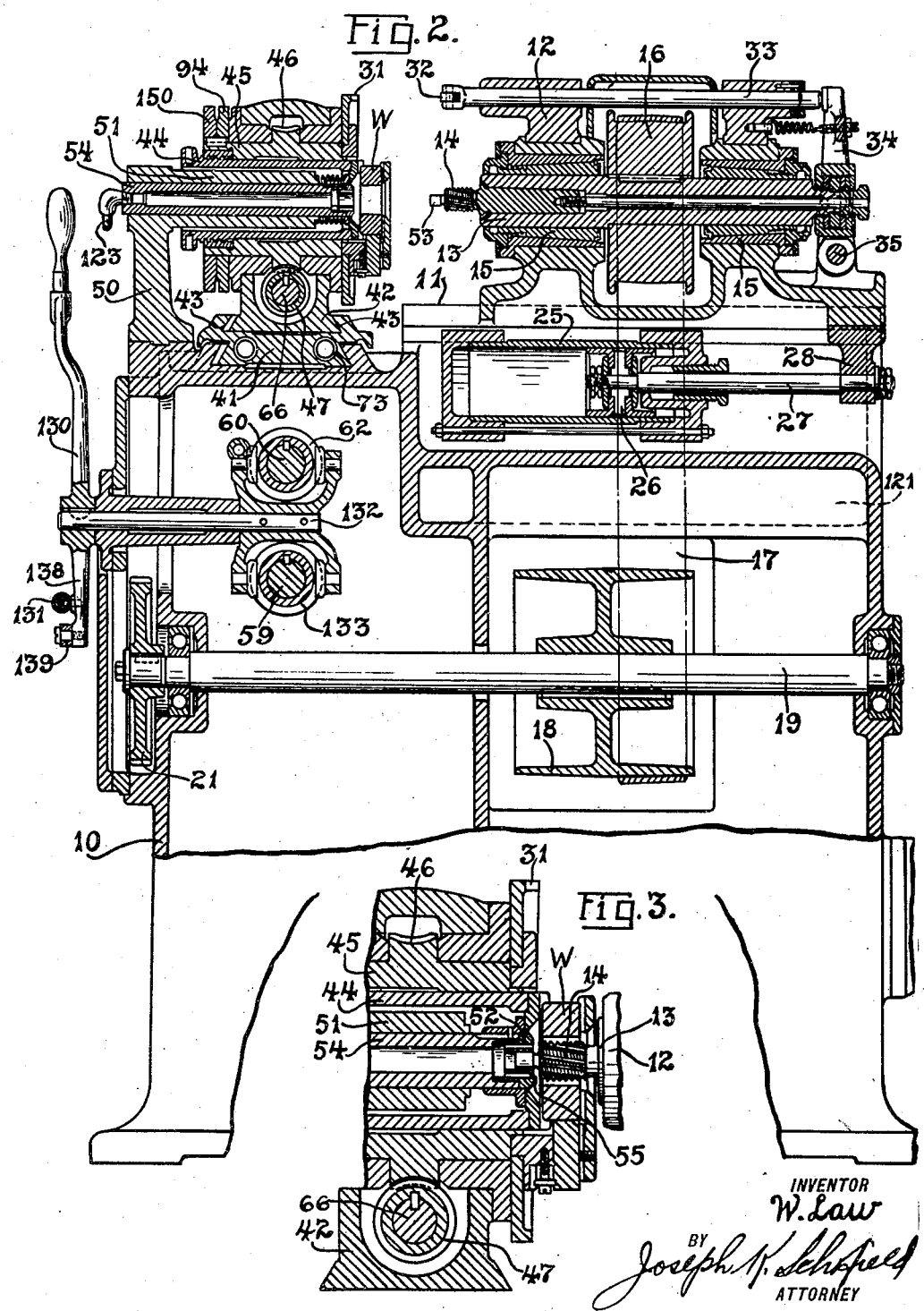

INVENTOR
W. Law
BY Joseph F. Schofield
ATTORNEY

July 1, 1930.  W. LAW  1,769,742
DIE HOBBING MACHINE
Filed Aug. 19, 1926   8 Sheets-Sheet 5

INVENTOR
W. Law
BY Joseph K. Schofield
ATTORNEY

July 1, 1930.　　　　　W. LAW　　　　　1,769,742
DIE HOBBING MACHINE
Filed Aug. 19, 1926　　　8 Sheets-Sheet 6

INVENTOR
W. Law
BY
Joseph K. Schofield
ATTORNEY

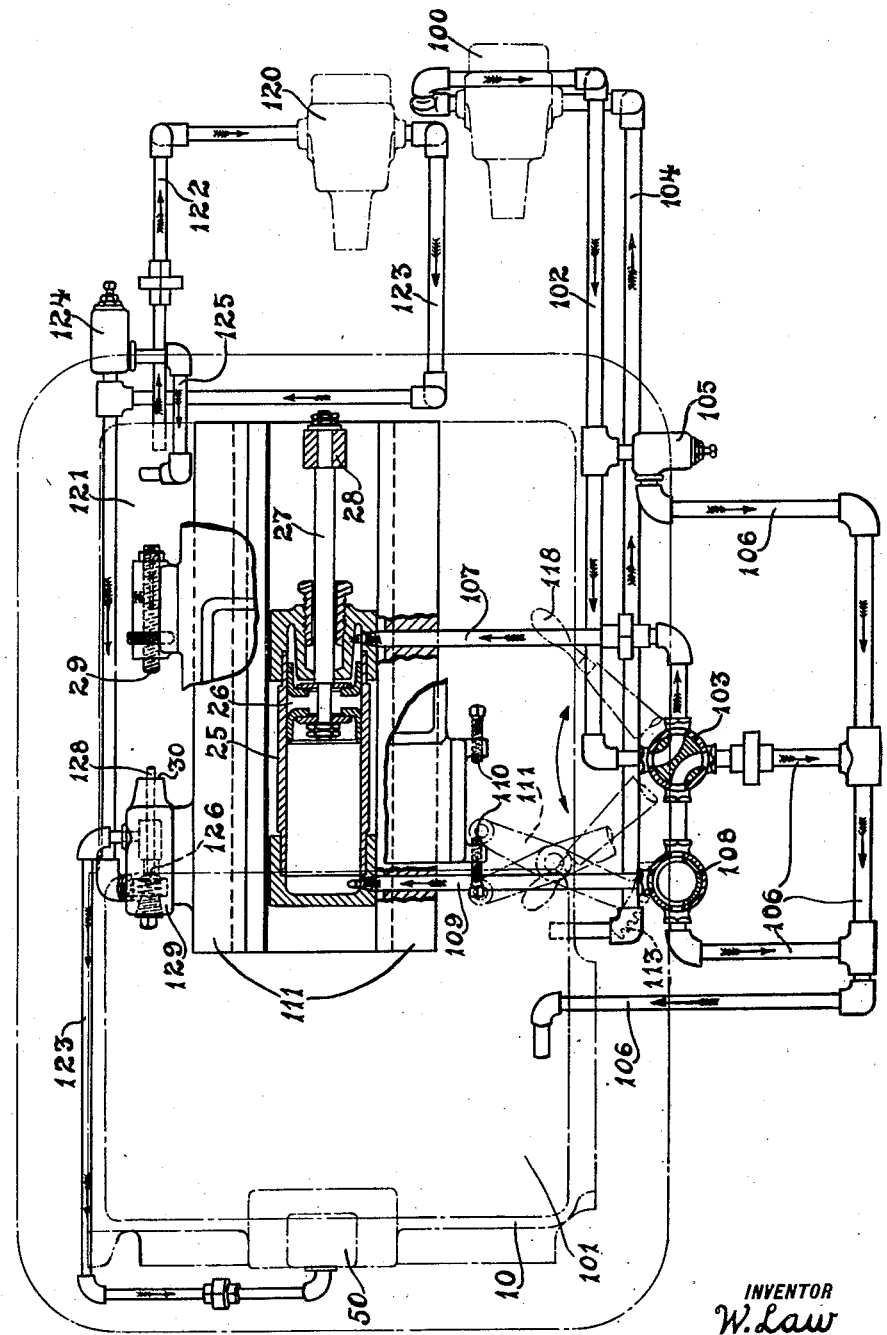

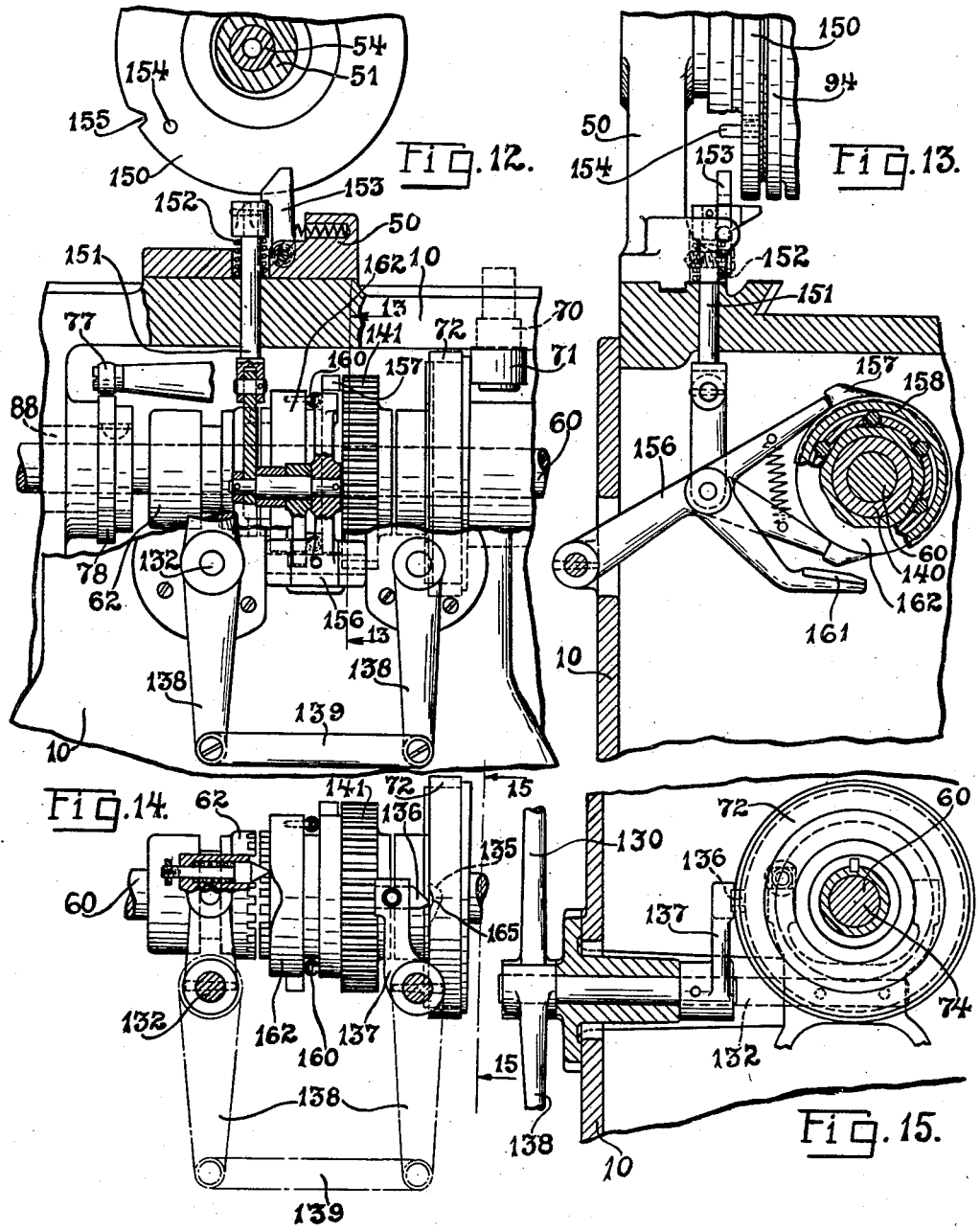

Patented July 1, 1930

1,769,742

UNITED STATES PATENT OFFICE

WILLIAM LAW, OF HARTFORD, CONNECTICUT, ASSIGNOR TO PRATT & WHITNEY COMPANY, OF NEW YORK, N. Y., A CORPORATION OF NEW JERSEY

DIE-HOBBING MACHINE

Application filed August 19, 1926. Serial No. 130,181.

This invention relates to a thread hobbing machine and in particular to a hobbing machine adapted to form relieved threaded portions on a screw threading die.

An object of the present invention is to provide a thread hobbing machine particularly adapted to semiautomatically form internal relieved screw threads, that is, to provide a machine of the above named type adapted to completely form the threaded portions of a screw threading die after the die blank has been mounted in operative position in a work supporting headstock.

Another object of the invention is to provide a spindle for rotatably mounting the hob or cutter which is adapted to be axially mounted within its carriage and to be moved axially a predetermined amount during rotation of the work blank to form the lead of the screw threads on the die.

Another object of the invention is to provide supporting means for the work blank being threaded adapted to slowly rotate it and adapting it to be movable during operation in a direction transverse to the axis on which the hob spindle is mounted.

Another object of the invention is to provide cam operated means to actuate the work blank and its headstock toward and from the axis of the hob spindle during rotation of the work blank to engage and disengage the hob relative to the blank.

Another object of the invention is to provide means adapted to effect predetermined different amounts of relieving movements to the work blank during its rotation.

Another object of the invention is to provide a headstock for the work blank having a large central opening extending axially therethrough, through which extends a support adapted to guide or pilot the free outer end of the hob and which also provides means for supplying a cutting fluid to the hob and work during operation.

Another object of the invention is to provide adjusting means for positioning the headstock carrying the work blank transversely of the hob spindle axis to adapt the machine for operation upon different diameters of dies, these means also being adapted to permit tapered threads to be formed.

Another object of the invention is to provide fluid operated mechanism for actuating the hob supporting carriage so that by manually operating a fluid controlling valve the carriage may be advanced to a fixed operative position, maintained in a fixed advanced operative position, and automatically returned to its initial inoperative position upon completion of the cycle of operations.

With the above and other objects in view, my invention consists in the features of construction and operation set forth in the following specification and illustrated in the accompanying drawings.

In the accompanying drawings annexed hereto and forming a part of the specification, I have shown my invention embodied in a threading machine for solid screw thread cutting dies having relieved cutting surfaces, but it will be understood that the invention can be otherwise embodied and that the drawings are not to be construed as defining or limiting the scope of the invention, the claims appended to this specification being relied upon for that purpose.

In the drawings:

Figure 1 is a front elevation of the complete machine.

Fig. 2 is a vertical sectional view, taken longitudinally of the machine through the center lines of the headstock and hob carriage, the hob carriage being shown in its inoperative position.

Fig. 3 is a similar but enlarged view of a portion of Fig. 2 showing the work blank and hob in operative position relative to each other.

Fig. 4 is an end elevation of the complete machine taken from the right-hand end of Fig. 1.

Fig. 8 is a vertical sectional view of the driving means for the machine and for the fluid circulating pumps.

Fig. 11 is a view in plan of the hydraulic means for actuating the carriage, parts being broken away and slightly displaced to more clearly show the mechanism.

Fig. 12 is a side elevation of the relief actuating and controlling mechanisms and their adjacent parts.

Fig. 13 is a front elevation in section of parts shown in Fig. 12, the section being taken on line 13—13 of Fig. 12.

Fig. 14 is a view similar to Fig. 12 of the controller cams and levers shown in Fig. 12, and Fig. 15 is a front elevation in section of the controller cams and levers shown in Fig. 14, the section being taken on line 15—15 of Fig. 14.

Figure 5:
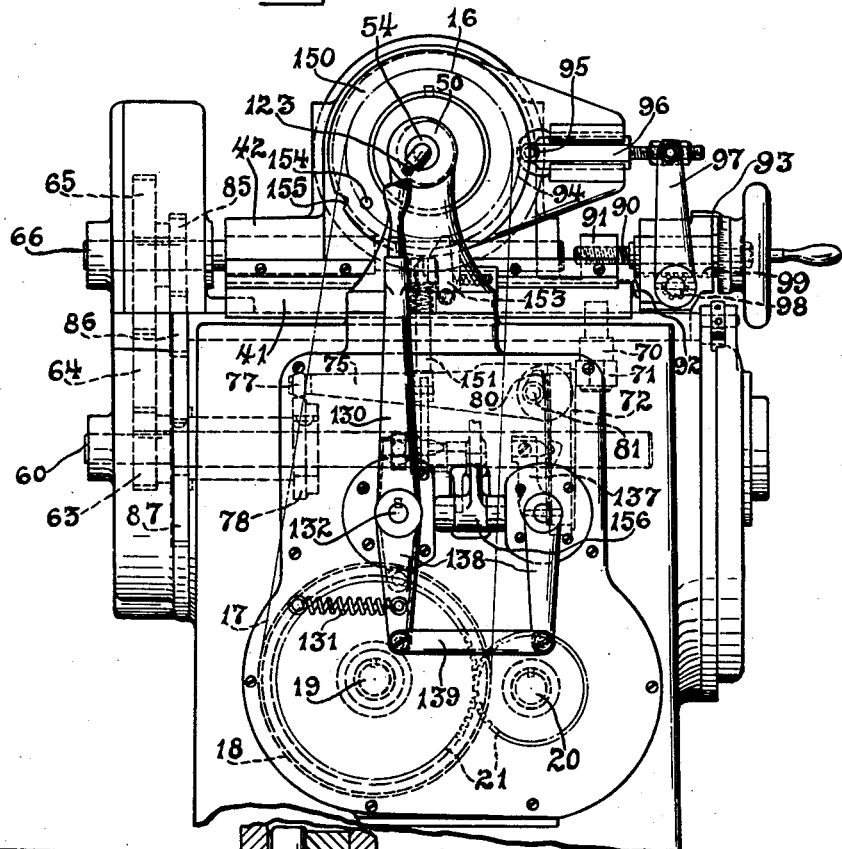
Fig. 5 is an end elevation taken from the left-hand end of the machine as shown in Fig. 1.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a base; second, a hob supporting carriage slidably mounted on said base; third, a rotatable hob spindle axially movable relative to and within the carriage; fourth, a work blank supporting headstock on the base; fifth, hollow rotating means for a blank support within said headstock; sixth, means to advance and retract said headstock and blank support during operation to effect relieving movements of the blank; seventh, adjusting means for the blank support to cause the hob to enter and cut the work blank; eighth, fluid operated means to move the hob carriage into and out of operative position relative to the work blank; ninth, cam means to effect a relative axial movement between the hob and work blank during operation; tenth, cam means to stop operation of the machine upon completion of its cycle of operations; eleventh, means to support the outer free end of the hob during operation upon the work blank; and twelfth, means to supply cutting fluid to the hob and work during operation.

Referring more in detail to the figures of the drawings, I provide a base 10 provided on its upper horizontal surface with longitudinally extending ways 11. Adapted for slidable engagement with these ways is a carriage 12 within which is rotatably mounted a hob carrying spindle 13 having a hob or other form of cutter 14 secured in one end. This spindle 13 preferably is supported within two bearings 15 adapted to be adjusted for wear and in addition to its rotative movement the hob carrying spindle 13 may be movable axially within the carriage 12. In order to rotate the spindle 13 at a high rate of speed it is provided with a pulley 16 centrally located and keyed to the spindle 13 drivingly connected by means of a belt 17 to a pulley 18 on a shaft 19 within the base 10. This shaft 19 may be rotated by any suitable means, as for instance by means of a parallel shaft 20 connected thereto through suitable gearing 21. The second mentioned shaft 20, which may be the main driving shaft of the machine, is adapted to be rotated by a main driving pulley 22 positioned beyond the end of the base 10.

In order to actuate the carriage 12 to move the hob 14 into and out of its operative or cutting position, a suitable cylinder 25 (see Fig. 2) is fixedly mounted within the upper portion of the base 10 within which is a piston 26 adapted to be reciprocated by means of fluid admitted at opposite ends of this cylinder 25. The means for admitting and exhausting fluid from the ends of this cylinder 25 will presently be described. The piston 26 is connected by means of a suitable connecting rod 27 extending out of one end of the cylinder 25 to a depending bracket 28 secured rigidly to the lower surface of the carriage 12. By means of the construction above described, the carriage 12, together with the spindle 13 carrying the hob 14, may be quickly advanced to operative position and, at the end of the cycle of operations of the machine, may be quickly withdrawn or returned to its initial position. During operation, which is usually a screw threading operation upon internal surfaces, the carriage 12 is advanced a maximum distance and is maintained fixedly in that position by means of an adjustable stop 29 on the carriage 12 coming into contact with a fixed stop 30 on the base 10. The position of the adjustable stop 29 may be adjusted very accurately by rotation of the screw which forms this stop. In this manner the operative position of the carriage 12 can be determined very accurately. The inoperative position of the carriage 12 is unimportant and so the piston 26 may be moved toward the right end of the cylinder 25 until it comes to rest. Fluid pressure is maintained within the right-hand end of the cylinder 25 throughout the cutting operation so that this carriage 12 is positively held in its fixed operative position.

In order to obtain the relative axial movement between the work blank W and hob 14 during the threading operation, the hob 14 is very slowly and uniformly retracted during the constant rotation of the work blank W. This work blank W is mounted for rotation about an axis parallel with that of the hob 14 and maintained in its position against axial movement and all lead forming movements are accomplished by this axial movement of the hob 14. The means for rotating and otherwise actuating the work blank W will presently be described. In order to obtain an axial movement of the hob 14 and its spindle 13, a side face cam 31 is mounted for rotation with the work blank W, which cam 31 is engaged by a roller 32 on the end of a bar or rod 33 slidably mounted in the carriage and extending parallelly with the hob spindle 13. The opposite end of this bar 33 engages a vertically disposed oscillating arm 34 which, at an intermediate point of its length, is pivotally connected with the hob spindle 13. The spindle 13 may therefore be withdrawn or otherwise axially actuated in accordance with the contour of the cam 31 while the work W is being constantly rotated. The oscillating arm 34 is mounted on a horizontally disposed shaft 35 in the carriage 12 which also has keyed to it a horizontally extending arm 36. The forward end of this arm 36 engages against a yielding plunger 37 and forces it inwardly. Due to the oscillatory movement of the vertical arm 34 caused by the slight movements of the rod 33, the horizontal arm 36 is gradually raised during operation, and, at the completion of operation is raised slightly above the resiliently pressed plunger 37. With the arm 36 in this position the plunger 37 moves forward under the free end of the arm 36, thus preventing the arm 36 from moving downward which would have the effect of forcing the hob 14 forwardly and possibly damaging the threads already cut in the work blank W. At this point in the operation of the machine the threads have been completed and the hob 14 and work blank W are disengaged and the carriage 12 returned to its initial inoperative position. In order to hold the rod 33 and the horizontal arm 36 in their proper operative positions, a coil spring 38 is provided, one end of which is made fast to the carriage 12 and the opposite end to the vertical arm 34, thus always forcing the rod 33 and arm 34 in one direction.

Also disposed on the upper horizontal portions of the base 10 are ways 40 extending in a direction transversely of the ways 11 for the hob carriage 12. Within these ways 40, which as shown in Fig. 2, are of dovetail form, is positioned a slide 41 on which is mounted a headstock 42. This headstock 42 engages dovetail ways 43 in the upper portion of the slide 41 so that the headstock 42 also may be adjusted relative to the slide 41 and in the same direction. Within this headstock 42 is a rotating member 44 forming the work blank supporting and rotating member. This preferably comprises a large sleeve keyed or otherwise secured to a body member 45 having worm gear teeth 46 upon its periphery. By means of a worm 47 extending parallel to the slide 41 and engaging the worm wheel 46, this body member 45 and the sleeve or hollow spindle 45 may be slowly rotated. Means for driving the worm 47 during operation of the machine will presently be described. Mounted at one end of this sleeve 44 is the work blank W, any desirable means of clamping the work blank W in position being used. Also mounted on the body member 45 so that it may rotate therewith is the side face cam 31 referred to above for effecting the lead forming movements of the hob 14 and its spindle 13 axially relative to the work blank W.

Mounted upon the end of the base 10 adjacent the headstock 42 is a fixed bracket 50 having a horizontally extending portion or arm 51 preferably formed integrally therewith passing through the blank carrying sleeve 44. This arm 51 carries a suitable bushing 52 at its outer end having an opening corresponding in diameter to the forward pilot 53 on the hob 14 so that during operation the outer end of the hob 14 is supported. The support or arm 51 on this bracket 50 may also be used for supplying cutting fluid to the work blank W and hob 14 during operation. For this purpose the arm 51 is provided with a sleeve or tube 54 adapted at one end to be connected to a source of cutting fluid and at its opposite end may be provided with securing means for the bushing 52, suitable openings 55 being provided adjacent the bushing 52 for admitting cutting fluid directly to the work blank W and hob 14. In order to permit transverse movements of the headstock 42 on which the work blank W is rotatably mounted, the opening within the sleeve 44 is made considerably larger than the outer diameter of the arm 51, the arm 51 being accurately aligned with the axis of the hob 14 and remaining in fixed position at all times. By these means the headstock 42 may be moved transversely of the hob axis to engage and disengage the hob 14 relative to the work W.

In order to rotate the blank W during operation, driving connections for the body member 45 are provided therefor from the main driving shaft 20. A worm 56 on this shaft 20 drives a worm gear 57 mounted on a sleeve 58 surrounding a transverse shaft 59 within the base 10 which is adapted to drive a second transverse shaft 60 through spur gears 61 when a clutch 62 splined to the second transverse shaft 60 is moved to its engaging position. With the clutch 62 in this position, rotation of the second transverse shaft 60 by means of a gear 63 on its end drives an intermediate gear 64 in mesh with a gear 65 on a shaft 66 disposed above and parallel to this transverse shaft 60. This shaft 66 is rotatably mounted in the headstock 42 and has keyed to it the worm 47. Rotation of this shaft 66 to which, as shown in Fig. 6, the gear 65 is splined, rotates the worm gear 46 on the body member 45 and thus rotates the work blank W.

Figure 9:
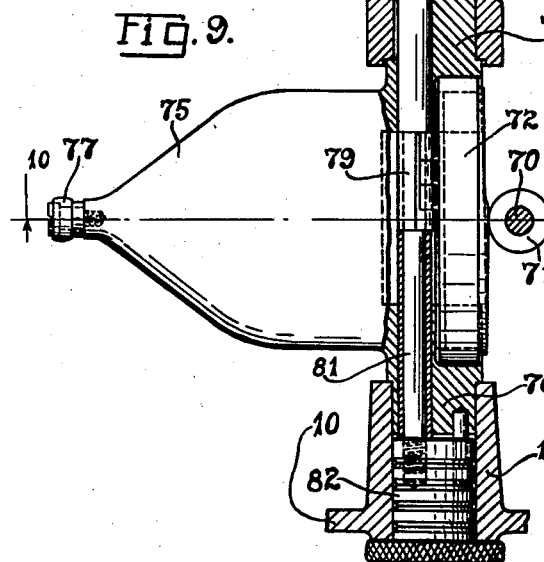
Fig. 9 is a plan view, partly in section, of the cam for effecting relieving movements of the work blank and its adjacent parts.
Figure 10:
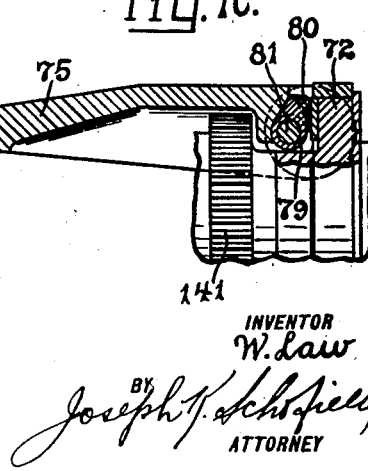
Fig. 10 is a sectional view of the relieving mechanism taken on the line 10—10 of Fig. 9.

In order to effect relieving movements of the work blank W during its rotation to form the relieved cutting surfaces on the threads of the die being operated on, the following mechanism is provided. Depending from the slide 41 on which the headstock 42 is mounted is a stud 70 having a roller 71 at its lower end. This roller 71 is adapted to contact with the cam face of a rotatable cam 72, preferably formed as shown in Figs. 5 and 6 and disposed upon a sleeve 74 rotatable about the axis of the second transverse shaft 60. Means to rotate this cam 72 to effect the advancing and receding movements of the work W with the hob 14 to engage and disengage the hob and work will presently be described. During rotation of the work W, during which the cutting operation is taking place, this cam 72 is maintained in a fixed rotative position and is rotated one-half revolution to engage the work W with the hob when the cutting operation is about to be begun. Also at the completion of the cutting operation the cam 72 is rotated the remaining half revolution to disengage the work W from the hob 14. The cam 72 is also adapted for slight axial movements on its shaft, these movements effecting corresponding movements of the roller 71 and the slide 41 on which the work supporting headstock 42 is carried. A spring or springs 73 serve to force the slide 41 in a direction to always contact with the cam 72 and force the cam 72 in one direction. In order to actuate this rotatable cam 72 axially and thus move the slide 41 carrying the headstock 42 and work W slight distances, a lever 75 is pivotally mounted within the base 10 in a substantially horizontal position. It is mounted to oscillate slightly upon suitable trunnions 76 about a fixed axis. At one end of this lever 75 is a roller 77 adapted to press against the periphery of a rotatable cam 78 preferably mounted co-axially with the second transverse shaft 60 whereby the lever 75 is oscillated. The opposite end of the lever 75 bears against a side face of the cam 72. On the pivotally mounted lever 75 is a slidable member 79 having short arms 80 thereon, preferably four or more of these short arms 80 of different characteristics are provided. By sliding this member 79 transversely with a rod 81 mounted in the lever 75, any one of the arms 80 may be brought into contact with the rotatable cam 72. These four short arms 80 are provided so that relieving movements of varying extent may be given the slide 41 and headstock 42. As shown in Fig. 9, these short arms 80 are moved by means of a member 82 extending within the trunnions on which the lever 75 is mounted for oscillation, indicating means being provided at the outer end so that the operator may know at all times which one of the arms 80 is in contact with the cam 72. From this mechanism it will be seen that slight oscillatory movements of this horizontal lever 75, due to the contour of the rotatable peripheral cam 78, will oscillate the short arms 80 a small amount, thus actuating the slide 41 and parts mounted thereon corresponding small distances.

In order to rotate the peripheral cam 78 so that it will oscillate the horizontally disposed lever 75 any predetermined number of times for each rotation of the work W, a gear 85 is splined on the shaft 66 carrying the worm 47 driving the body member 44 within the headstock 42, which, through intermediate gears 86 drives a gear 87 keyed on the outer end of a sleeve 88 co-axially mounted about the second transverse shaft 60. The peripheral cam 78 is mounted directly upon the inner end of this sleeve 88. The cam 78 is of the single rise type and rotates as many times for each rotation of the body member 44 in the headstock 42 as there are threaded portions in the die W being formed. In order to adapt this cam 78 to make different numbers of rotations for each rotation of the die W, the intermediate gears 86 and the gear 87 on the sleeve 88 carrying the cam 78 may be mounted for ready substitution.

Figure 6:
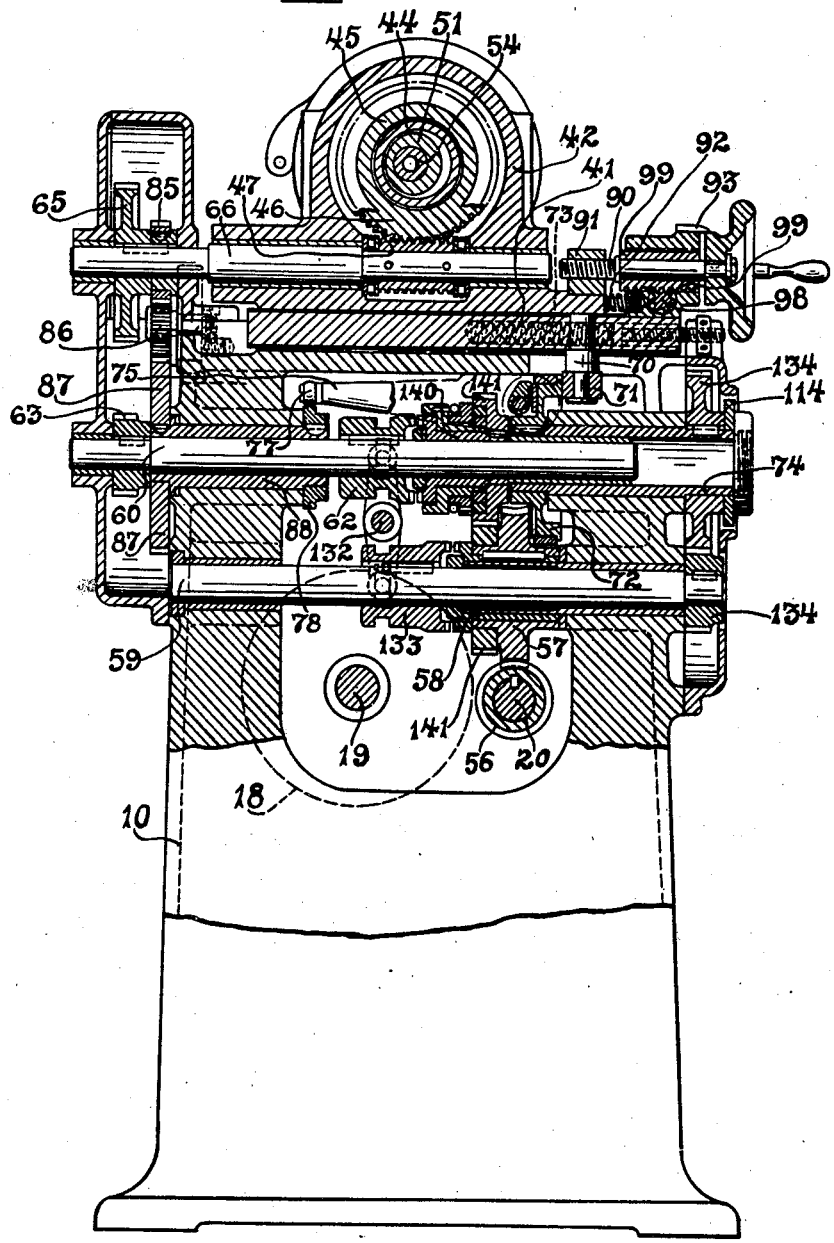
Fig. 6 is a transverse sectional view taken substantially upon the line 6—6 of Fig. 1.
Figure 7:
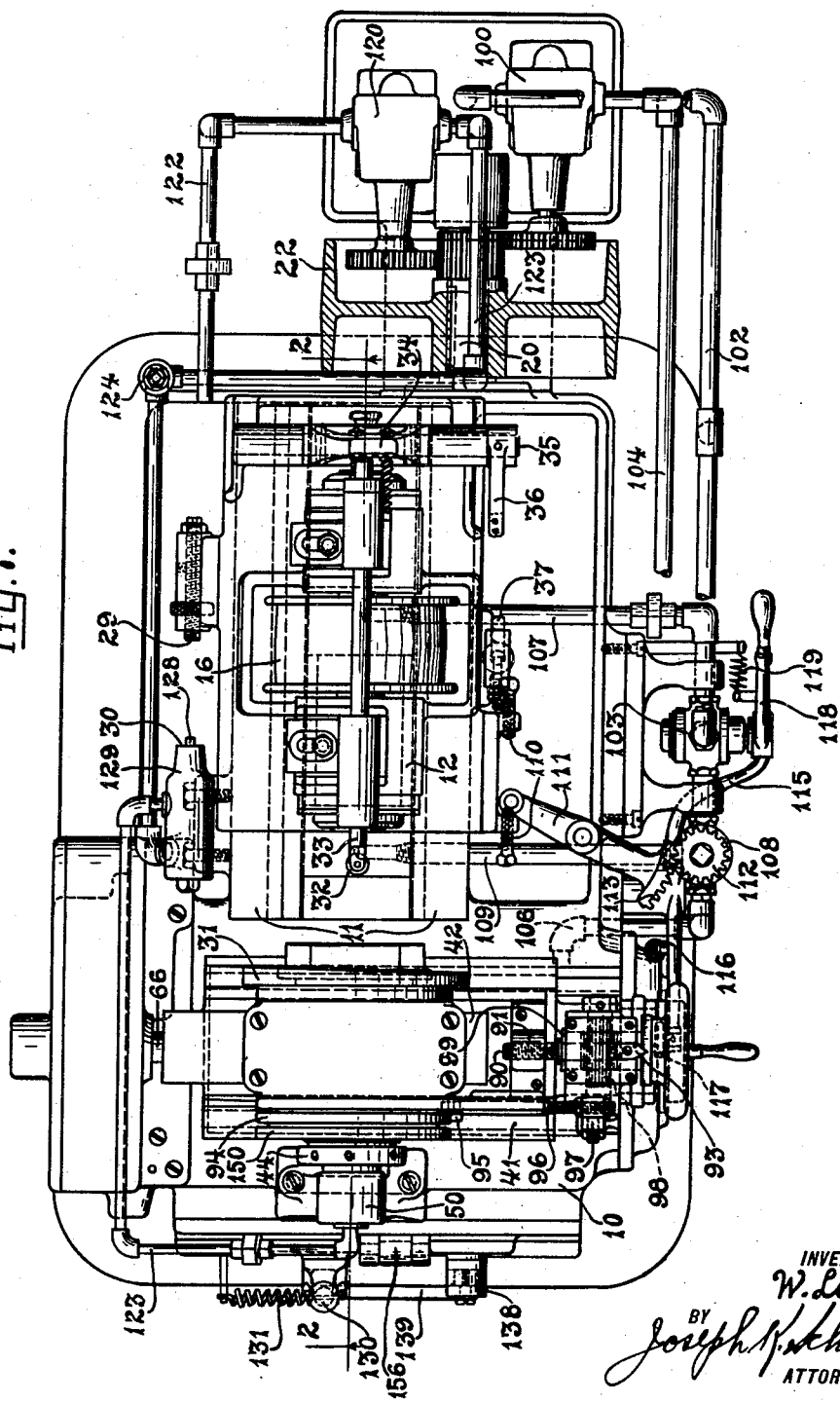
Fig. 7 is a complete plan view of the machine.

Also, as shown in Fig. 6, the headstock 42 is slidably mounted on the slide 41 and may be adjusted relative thereto by means of a screw 90 disposed in the forward end of the slide 42 which is in engagement with a nut 91 secured to the headstock 42. Rotation therefore of this screw 90 will vary the position of the headstock 42 for different adjustments of the headstock 42 necessitated for different sizes of hobs 14 and dies or other work blanks W. A spring 92 interposed between the slide 41 and the headstock 42 maintains the headstock 42 resiliently in one direction. Indicating means 93 to facilitate adjustment of the headstock 42 are provided so that the operator may at all times know the precise adjustment of the headstock 42.

In order to adapt the machine for operation upon screw threads of slightly tapered form, such as pipe threads, a correspondingly tapered hob 14 may be employed and, during its movement in an axial direction while the tapered threads are being formed, the headstock 42 is actuated transversely to slightly vary the position of the hob 14 relative to the die W. For this purpose a cam 94 of slightly spiral form is mounted on one end of the body member 45 within the headstock 42 and co-axial with the body member, which is adapted to contact with a roller 95 on the inner end of a small slide 96. This slide 96, by means of the connections shown in Fig. 5, is adapted to oscillate a substantially vertical arm 97 pivotally mounted in the slide 41. A pinion 98 mounted on the axis about which this arm 97 is pivotally mounted engages a rack 98 formed on the lower surface of a sleeve 99 within which the screw 90 is rotatably mounted. By this means, during the rotation of the body member 45, the sleeve 99 may be axially moved, thus correspondingly actuating the headstock 42. When operating upon screw threads having no taper, the sleeve 99 may be locked in fixed position in the slide and the oscillating arm 97 and slide 96 may be dispensed with.

In order to advance the carriage 12 on which the hob or cutter 14 is mounted into and out of its operative positions, the following mechanism is provided. The piston 26 referred to above is moved in a direction to advance the hob 14 to its cutting position by admitting fluid under pressure to the right-hand end of the cylinder 25 and simultaneously exhausting fluid from the left-hand end. The conduits for this purpose are shown clearly in Fig. 11. In this figure the conduits are slightly displaced to avoid confusion and the operating valves are shown in positions to most clearly disclose their construction. A pump 100 constantly operating when the main shaft 20 is rotating takes fluid from a suitable tank 101 within the base 10 of the machine and forces it through a conduit 102 leading to a four-way valve 103. The intake conduit 104 extends from the tank 101 to the suction side of the pump 100. Within the discharge conduit 102 is a pressure relief valve 105. When a predetermined pressure is reached in the conduit 102 the fluid may drain into the tank 101 through the return conduits 106. The valve 103 in one operative position, which is shown in Fig. 11, permits the fluid under pressure through conduit 102 to flow into a conduit 107 which enters a suitable opening at the right-hand end of the cylinder 25. With the controlling valve 103 in this position, another valve 108 adjacent thereto of the three-way type is positioned to exhaust fluid from the left-hand end of the cylinder 25 through a conduit 109 entering the left-hand end of the cylinder, thus permitting the fluid to drain back again into the tank 101 through the return conduits 106. To effect the cycle of operations of the machine the four-way controller valve 103 is first operated to the position shown in Fig. 11 to advance the hob 14 on its carriage 12 to its operative position.

Movement of the carriage 12 in this direction by means of adjustable stops 110 thereon adapted to contact with a lever 111 rotates the three-way valve 108 through the gear 112 and segment 113. Return movement of the piston 26 to move the carriage 12 to its initial and inoperative position is controlled by means of a cam 114 keyed to the sleeve 74 carrying the cam 72 below the work carrying headstock 42. This cam 114 is shown in Fig. 1 and operates a lever 115 pivotally mounted on the base and normally forced toward cam engaging position by a spring 116. One end of this lever 115 has a roller 117 contacting with the periphery of this cam 115 and the opposite end is adapted to engage a short depending arm 118 on the operating handle connected to the four-way valve 103. During operation of the machine the lever operating the controller valve 103 is held in fixed position by lever 115 engaging the arm 118 to prevent return movement of the carriage 12 while the hob 14 is in engagement with the work W. As soon as operation of the machine is completed the lever 115 is oscillated by cam 114 thus releasing the controller handle from the lever 115 and permitting the four-way valve 103 to move to a position to admit fluid to the left-hand end of the cylinder 25 and also exhaust the fluid from the right-hand end. In order to move the valve 103 in this direction a spring 119 is provided which acts to rotate the valve 103 as soon as lever 115 moves to release the short arm 118.

Figure 4:
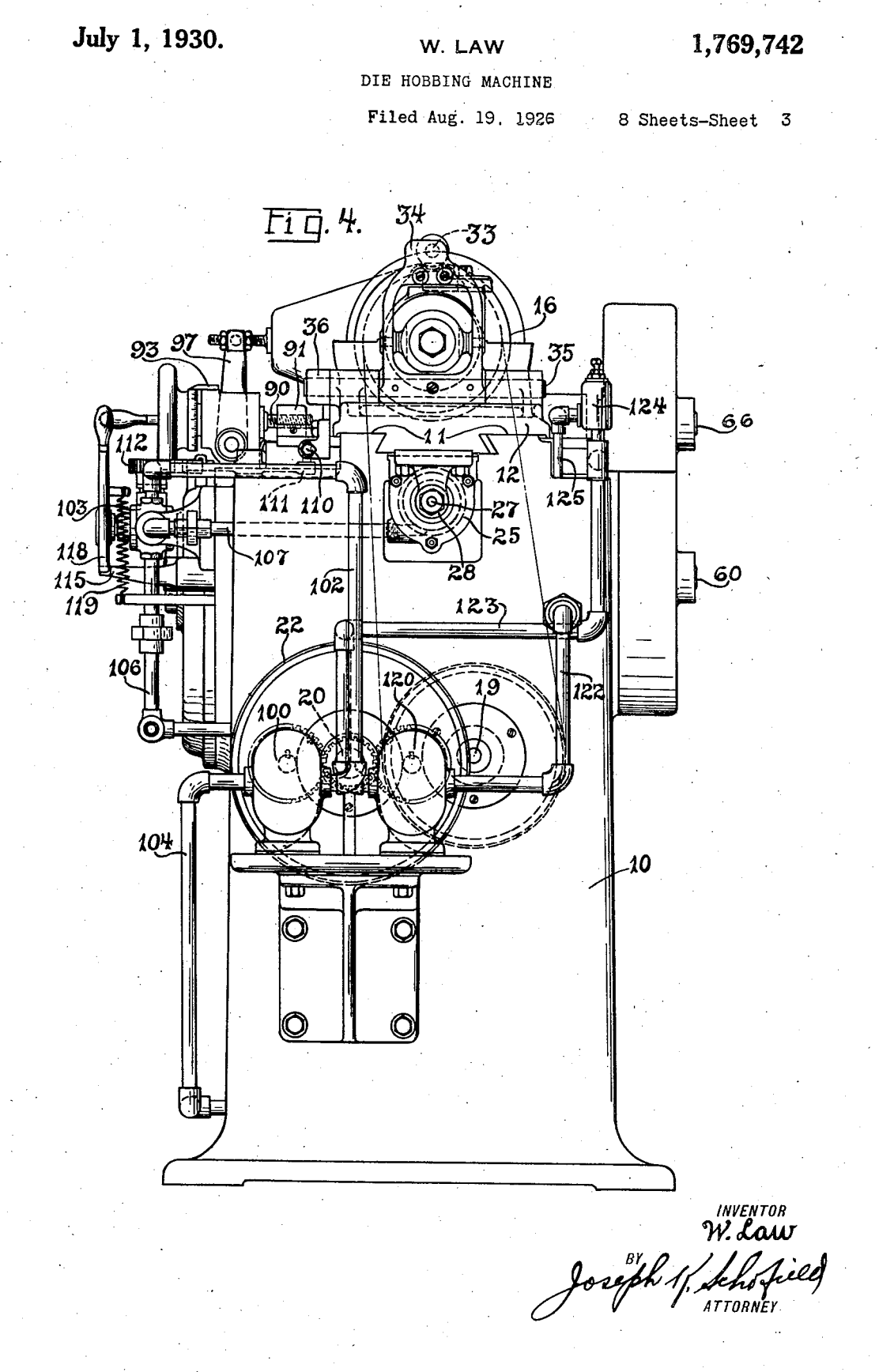

In addition to the fluid circuits for operating the carriage 12, a second supply is provided for supplying a cutting fluid to the hob 14 and work W during operation. For this purpose a second pump 120 is drivingly connected, as shown in Fig. 4, to the main drive shaft 20 and takes oil from a second tank 121 within the base 10 and delivers it directly to the space adjacent the work W and hob 14. An intake conduit 122 extends from within the tank 121 to the suction side of the pump 120. A discharge conduit 123 extends from the pump to the sleeve 54 within the arm 51, from which sleeve the fluid passes to the work as described above. Within the conduit 123 is a relief valve 124 permitting fluid to be returned to the tank 121 when the pressure exceeds a predetermined maximum through a conduit 125. As fluid is only required while the carriage 12 is in its advanced or operative position and during operation, a valve 126 is inserted in conduit 123, shown clearly in Fig. 11, to control the supply of this cutting fluid. The stop 29 on the carriage 12 engages the free end of the stem 128 on this valve 126 when the carriage 12 is in its operative position thus moving this valve 126 to its open position. A spring within the valve housing 129 returns the valve 126 to its closed position as soon as the carriage 12 is moved out of its operative position. The stop 29 and the end face of the housing 129 for the valve 126 are used also to determine the advanced or operative position of the carriage 12, the housing 129 forming the fixed stop 30 referred to above. During operation fluid in the right end of the cylinder 25 forces the carriage 26 in a direction to maintain the stop 127 against the housing 129.

As soon as the carriage 12 has been advanced to its operative position the operator oscillates a vertical lever 130 rearwardly against the pressure of a spring 131. This movement of the lever 130 oscillates a controller shaft 132 within the base to which it is keyed. This movement of the shaft 132 engages a clutch member 133 splined to the first transverse shaft 59 with its cooperating member rotating with the worm gear 57 and thus rotates this shaft 59. Rotation of this shaft 59 rotates the sleeve 74 through the spur gears 134 and thus rotates the cams 114 and 72. These cams 114 and 72 rotate approximately one-half a revolution until a deep depression 135 in a side face of cam 72 permits a projection 136 to enter and oscillate its arm 137 connected to the oscillatory controller shaft 132 by arms 138 and link 139. Rotation of the cam 72 through its half revolution forces the slide 41 in a direction to engage the work W with the hob 14 and, during operation, the cam 72 and its sleeve 74 remain stationary. Cam 114 rotates through its half revolution without oscillating the lever 115 but positions this cam 114 so that the lever 115 will be oscillated immediately upon the second half revolution of this cam 114.

The controller shaft 132 is then oscillated by its spring 131 to disengage clutch 133 and engage the clutch 62 on shaft 60. This forward movement of the lever 130 and oscillation of the shaft 132 in a clockwise direction as viewed in Fig. 6 moves the clutch 62 keyed to the second transverse shaft 60 to a position to engage its cooperating member on a sleeve 140. This latter member on sleeve 140 is constantly rotated when the shaft 20 is rotated through a pair of spur gears 141 and worm gear 57. With the clutch 62 on the second transverse shaft 60 engaged, this shaft 60 is rotated thus rotating the driving pinion 63 on its outer end from which the worm shaft 66 in the headstock 42 and the relieving cam 78 are rotated in timed relation to each other. During this rotation of the second transverse shaft 60 the cutting operation takes place.

At the completion of the cutting operation during which the work W rotates one complete revolution, the second transverse shaft 60 is stopped by a trip mechanism operated by a member 150 on the body member 45 which, as stated above, rotates with the work W. Directly below this member is a vertically movable plunger 151 spring pressed upward by a coil spring 152 and adapted to be held in its lower position by a latch 153. During the cutting operation the plunger is held in its lower position and just before the completion of the cutting operation the latch 153 is released from the plunger 151 by engagement with a pin 154 outstanding from the member 150. The plunger 151 may therefore rise slightly and bear against the periphery of the member 150. As soon as a notch 155 passes over the plunger 151 the plunger rises under the pressure of the spring 152. Movement upward of the plunger 151 elevates an arm 156 from a projection 157 on a roller clutch 158 on the second transverse shaft 60. Springs 160 cause this friction clutch to be engaged and rotate the sleeve 140 until arm 161 strikes projection 157 which again disengages the roller clutch 158. This movement of the sleeve 140 is approximately one-half a revolution and rotates cam 162 which oscillates the shaft 132 by a projection 163 and disengages the clutch 62. Movement of the shaft 132 by cam 163 is sufficient not only to disengage clutch 62 but also engage 133 so that the shaft 59 is again rotated to rotate the cams 72 and 114. Clutch 133 is held in engagement by the projection 136 bearing against the side surface of cam 72 until a shallow depression 165 permits the projection to oscillate its arm 137 and through the arms 138 and link 139 oscillate the controller shaft 132 to its neutral or central position. While the clutch 133 is thus engaged the cam 72 is quickly rotated a half revolution and thus returns the slide 41 and headstock 42 to their inoperative position. The work W is therefore withdrawn from the hob 14. Simultaneously cam 114 is being rotated a half revolution which oscillates the lever 115 and permits return of the valve 103 to its initial position which forces the carriage 12 to its inoperative or right-hand position.

What I claim is:

1. A thread hobbing machine comprising in combination, a base, a carriage thereon, a hob carrying spindle rotatably mounted in said carriage, a work supporting headstock transversely movable on said base, a body member within said headstock, means to slowly rotate said body member, means to advance and retract said carriage, and cam means on said body member and rotatable therewith to axially move said hob carrying spindle within its carriage in timed relation to the rotative movement of the body member.

2. A thread hobbing machine comprising in combination, a base, a carriage slidably mounted thereon, a hob carrying spindle rotatably mounted in said carriage upon an axis parallel to the direction of movement of said carriage, a work supporting headstock transversely movable on said base, a body member within said headstock, means to slowly rotate said body member, means to advance and retract said carriage, and cam means on said body member and rotatable therewith to axially move said hob carrying spindle within its carriage in timed relation to the rotative movement of the body member.

3. A thread hobbing machine comprising in combination, a base, a carriage slidably mounted thereon, a hob carrying spindle rotatably mounted in said carriage, a work supporting headstock transversely movable on said base, a body member within said headstock, means to slowly rotate said body member, a cam on said body member, and linkage connected to said hob spindle and contacting with said cam, whereby said hob spindle is moved axially within the carriage in timed relation to the rotation of said body member.

4. A thread hobbing machine comprising in combination, a base, a carriage slidably mounted thereon and adapted to be moved between fixed stops, a hob carrying spindle rotatably mounted in said carriage, a work supporting headstock transversely movable on said base, a body member within said headstock, means to slowly rotate said body member, a cam on said body member, and linkage connected to said hob spindle and contacting with said cam when the carriage is in a fixed operative position, whereby said hob spindle is moved axially within the carriage in timed relation to the rotation of said body member.

5. A cutter supporting means for a thread hobbing machine comprising in combination, a base, a rotatable cutter thereon, a hollow work supporting headstock on said base, a bracket fixed to said base and having an arm formed integrally therewith extending within said hollow headstock, and a removable bushing forming a bearing within the free end of said arm whereby the outer end of the cutter may be supported during operation.

6. A cutter supporting means for a thread hobbing machine comprising in combination, a base, a rotatable cutter slidably mounted thereon for movement into and out of operative position, a hollow work supporting headstock on said base movable transversely to said cutter, a bracket fixed to said base and having an arm extending within said hollow headstock permitting transverse movement of said headstock, and a bearing formed in the free end of said arm whereby the outer end of the cutter may be supported when in its operative position during operation.

7. A cutter supporting means for a thread hobbing machine comprising in combination, a base, a rotatable cutter slidably mounted thereon for movement into and out of operative position, a hollow work supporting headstock on said base movable transversely of said cutter, a bracket fixed to said base and having an integral arm extending within said hollow headstock and permitting transverse movement of the headstock, and a removable bushing forming a bearing in the free end of said arm whereby the outer end of the cutter may be supported while in operative position and during operation.

8. A thread hobbing machine comprising in combination, a base, a cutter carriage slidably mounted thereon, means to move said carriage between fixed positions on said base into and out of operative position, a cutter spindle rotatably mounted therein and movable axially relative to said carriage, a work supporting headstock, means to slowly rotate a work blank within said headstock, cam means to slowly move said cutter spindle axially within its carriage during rotation of the work blank, and controlling means whereby the movements of the carriage and spindle and rotation of said work blank may be actuated in accordance with a predetermined sequence.

9. A thread hobbing machine comprising in combination, a base, a cutter carriage slidably mounted thereon, fluid operated means to move said carriage between fixed positions on said base, a cutter spindle rotatably mounted therein and movable axially relative to said carriage, a work supporting headstock, cam means to move said headstock in a direction transverse to the axis of rotation of the cutter spindle, means to slowly rotate a work blank within said headstock, and means to slowly move said cutter spindle axially within its carriage during and in timed relation to the rotation of the work blank.

10. A thread hobbing machine comprising in combination, a base, a cutter carriage slidably mounted thereon, means to move said carriage in a straight line between fixed positions on said base, a cutter spindle rotatably mounted therein and movable axially relative to said carriage, a work supporting headstock, means to slowly rotate a work blank within said headstock, cam means mounted coaxially with said work blank and adapted to rotate therewith to slowly move said cutter spindle axially within its carriage during rotation of the work blank, and controlling means whereby the movements of said carriage and spindle and rotation of said work blank may be actuated in accordance with a predetermined sequence.

11. A thread hobbing machine comprising in combination, a base, a cutter carriage slidably mounted thereon, fluid operated means to move said carriage in opposite directions in a straight line between fixed positions on said base, a cutter spindle rotatably mounted therein and movable axially relative to and in a direction parallel to said carriage, a work supporting headstock, means to reciprocate said headstock transversely of the direction of movement of said carriage, means to slowly rotate a work blank within said headstock, means to slowly move said cutter spindle axially within its carriage during and in timed relation to the rotation of the work blank, and cam means to move said spindle and headstock in timed relation to each other.

12. A thread hobbing machine comprising in combination, a base, cutter carriage slidably mounted therein, a fluid operated means to move said carriage between fixed positions on said base, a cutter spindle rotatably mounted therein and movable axially relative to said carriage, a work supporting headstock, means to slowly rotate a work blank within said headstock, means to slowly move said cutter spindle axially within its carriage during rotation of the work blank, manual operating means for said fluid means to move the carriage in one direction, and automatic means for operating said fluid means to move the carriage in the opposite direction.

13. A thread hobbing machine for internal surfaces comprising in combination, a base, a cutter carriage slidably mounted thereon, fluid means to hold said carriage in a fixed operative position, a cutter spindle rotatably mounted therein and movable axially relative to said carriage, a work supporting headstock, means to slowly rotate a work blank within said headstock, and cam means on said headstock to slowly move said cutter spindle axially within its carriage during rotation of the work blank and while said carriage is maintained in fixed position.

14. A thread hobbing machine comprising in combination, a base, a cutter carriage slidably mounted thereon, fluid operated means to reciprocate said carriage into and out of operative position, a cutter spindle rotatably mounted therein and movable axially relative to said carriage, a work supporting headstock, means to slowly rotate a work blank within said headstock, and cam means on said headstock to slowly move said cutter spindle axially within its carriage during rotation of the work blank and while said carriage is in its operative position.

15. A thread hobbing machine comprising in combination, a base, a cutter carriage slidably mounted thereon, a cutter spindle rotatably mounted therein and movable axially relative to said carriage, a work supporting headstock, means to slowly rotate a work blank within said headstock, and cam means on said headstock to slowly move said cutter spindle axially within its carriage during rotation of the work blank and while said carriage is maintained in fixed position.

16. A thread hobbing machine comprising in combination, a base, a cutter carriage slidably mounted thereon, a cutter spindle rotatably mounted therein and movable axially relative to said carriage, a slide movable transversely to the axis of rotation of said spindle, a work supporting headstock thereon, means to adjust said headstock on said slide, means to slowly rotate a work blank within said headstock, and cam means on said headstock to slowly move said cutter spindle axially within its carriage during rotation of the work blank.

17. A thread hobbing machine comprising in combination, a base, a cutter carriage slidably mounted thereon, fluid operated means to reciprocate the carriage between predetermined positions, a cutter spindle rotatably mounted therein and movable axially relative to said carriage, a slide movable transversely to the axis of rotation of said spindle, a work supporting headstock, means to slowly rotate a work blank within said headstock, and cam means on said headstock to slowly move said cutter spindle axially within its carriage during and in timed relation to the rotation of the work and while said carriage is held in one of its positions.

In testimony whereof, I hereto affix my signature.

WILLIAM LAW.